March 18, 1941.  H. KOESTER  2,235,435

SELF-LOCKING SETSCREW

Filed June 8, 1939

INVENTOR.
HERMAN KOESTER
BY
ATTORNEY.

Patented Mar. 18, 1941

2,235,435

UNITED STATES PATENT OFFICE 2,235,435

SELF-LOCKING SETSCREW

Herman Koester, Waterbury, Conn., assignor to The Bristol Company, Waterbury, Conn., a corporation of Connecticut Application June 8, 1939, Serial No. 278,022

5 Claims. (Cl. 151—32)

This invention relates to metal setscrews, and more especially to a form of setscrew which shall be inherently self-locking without the need for washers or other accessory parts or for specially formed threads. It has formerly been proposed to render setscrews self-locking by expanding and serrating portions of the thread, and also by forming a knurl on the point which engages the clamped surface. It has been found however, that screws of the former type mutilate the threaded hole in which they are used to an extent rendering subsequent adjustment or replacement difficult, while under the latter expedient the locking effect is incomplete, in that an infinitesimal axial displacement of a screw after tightening is sufficient to disengage the locking surfaces and permit loosening under vibration.

It is an object of this invention to provide a self-locking setscrew which shall be integral and without accessory parts.

It is a further object to provide a setscrew of the class described which shall be usable without mutilation of the female thread with which it is engaged.

It is a further object to provide a setscrew of the class described which shall be capable of repeated use with a minimum of depreciation in service.

Still another object is found in the provision of a setscrew of the class described, which may readily be manufactured at a reasonable cost and on production machinery of standard and conventional types.

It is proposed to accomplish the desired objects by forming on the engaging end or tip of a screw during manufacture a plurality of locking teeth comprising the substantial equivalent of a ratchet, and adapted so to act in a sense radial to the axis of the screw.

The nature of the invention, however, will best be understood when described in connection with the accompanying drawing, in which.

Figure 1:
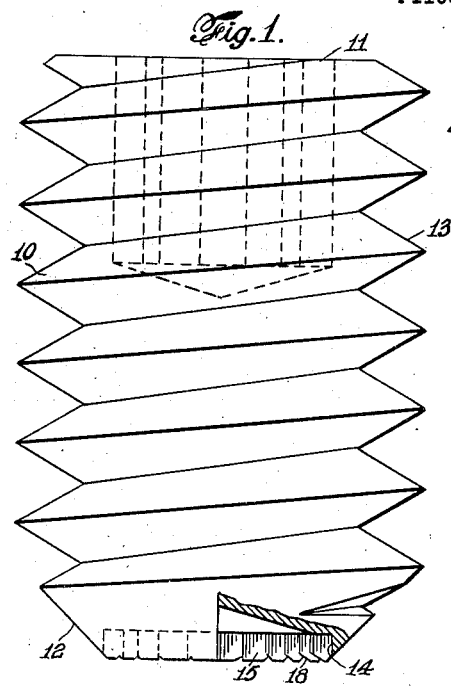
Fig. 1 is a side elevation, partly in vertical section, of a setscrew embodying the invention.
Figure 2:
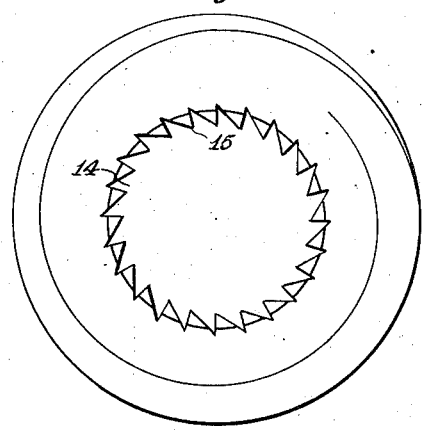
Fig. 2 is an end elevation of the same, looking toward the point or tip.

Referring to the drawing, in Figs. 1 and 2 is shown a setscrew having a solid body portion 10 and a shaped head portion 11, preferably (though not necessarily) of the recessed or splined type, and a tapered tip portion 12 conformed to embody the principles of the invention, as hereinafter set forth. As is usual in setscrews of this class, a conventional thread 13 is formed on the exterior surface of the screw and extending substantially throughout its entire length. The tip portion 12 is given a blunt taper by being turned or otherwise reduced to the form of the frustum of a cone having its smaller diameter approximately half the over-all diameter of the screw.

Formed within the tip of the screw at the extreme outer portion is a circular recess 14, coaxial with the body part 10, and having formed upon its internal circumference, as by broaching, a plurality of evenly spaced and similar teeth 15, each having a uniform cross-section extending axially of the screw for a material part of the depth of the recess 14.

Figure 3:
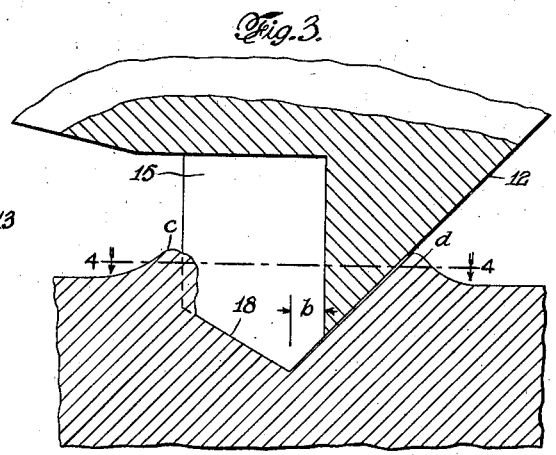
Fig. 3 shows to an enlarged scale a radial section of a portion of the tip of a screw of the class described, when in engagement with a coacting surface, the section being taken as on the line 3—3, Fig. 4, and looking in the direction of the arrows.
Figure 4:
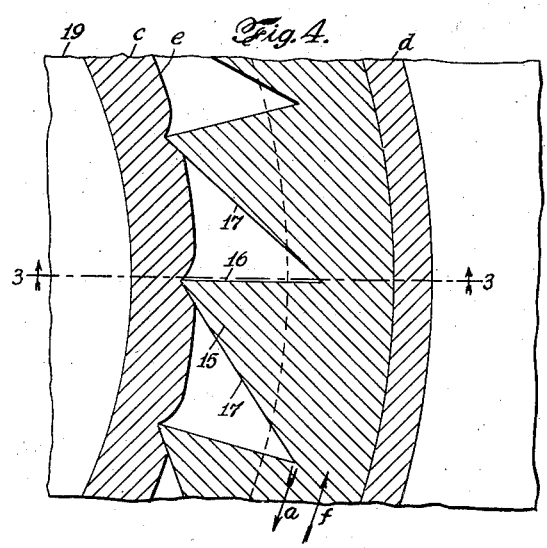
Fig. 4 is a horizontal sectional view, as taken on the line 4—4, Fig. 3, and looking in the direction of the arrows.

The preferred conformation of the teeth will be understood by reference to Figs. 3 and 4. The contour of each tooth, as viewed axially of the screw, is formed to an angle asymmetrically disposed with respect to the radius of the screw, thus giving each tooth a certain degree of "rake," and the magnitude and position of the angle is constant throughout the axial extent of the tooth. The contour of a tooth may, for example, have one side 16 disposed substantially along a radius of the screw and another side 17 disposed angularly thereto and to any radius which may intersect it, a side 17 serving to join the radially external end of one of the sides 16 to the radially internal end of that one of the sides 16 which immediately follows it when the screw is being tightened by rotation in a clockwise sense, as shown by the arrow a. The above geometrical conformation, when developed into a third dimension by projection in a sense axial to the screw (as mechanically effected in the act of broaching) provides a tooth bounded by two plane surfaces, one substantially radial to the screw, and the other forming an angle with any intersecting radius.

The radial dimensions of the teeth are made such that the radially external angle between two adjacent teeth will lie at a distance from the axis of the screw slightly greater than the smaller radius of the conically tapered portion 12 of the tip of the screw, this distance being represented by b in Fig. 3. The axial ends of the radially inward-extending portions of the teeth are formed to a chamfer 18, as by countersinking the surface of the screw surrounding the recess 14 from the inner edge of the conical tip 12 toward the axis, thereby eliminating flat surfaces from the point of the screw and providing a cutting edge thereon.

The action of the device will be understood by reference to Figs. 3 and 4, wherein is shown the effect produced by the tip of a screw formed in accordance with the invention. At 19 is shown a portion of material softer than that of the screw (such as mild steel, with which is employed a hardened screw) having a normally flat surface with which a setscrew having a tip portion conformed as hereinbefore described is forcibly driven into engagement.. The action of the point of the screw as it is subjected to a combined rotary and axial motion, is twofold, the chamfered face 18 and the conical tip portion 12 coacting to upset the metal both inwardly and outwardly of the screw, as shown at c and d, and the oblique faces of the teeth 15 tending to cause a flow of the upset metal c toward the center of the screw without material shearing action. This results in the portion of the metal c within the recess tending to form a ring engaged by the tip of the screw and having a generally cylindrical outer face, which, by reason of the wiping action of the oblique surfaces of the teeth 15 in forming the same, will tend to flow or expand slightly into the interstices between the teeth, forming axial corrugations (shown to an exaggerated scale at e, Fig. 4) tightly gripped by the teeth.

It will be obvious that, because of the "rake" or ratchet effect of the teeth 15, any tendency of the screw to loosen by counter-clockwise rotation, as indicated by the arrow f, will result in the corrugations e being more firmly gripped by the teeth 15, so that in order to remove the screw it is necessary actually to scrape or shear metal from the sides of the ring c. Furthermore, it will be obvious that, should the screw be axially displaced tending to release it from endwise contact with the material 19, it will still be prevented from further loosening due to counter-clockwise rotation by its engagement with the metal c, and will continue so until the displacement has reached such a magnitude that the teeth 15 on the screw may rotate clear of the projecting ring of the metal c formed on the surface of the engaged body.

Figure 5:
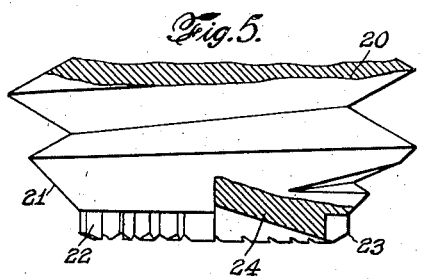
Fig. 5 is a fragmentary side elevation, partly in vertical section, of an alternative form of setscrew embodying the principles of the invention.
Figure 6:
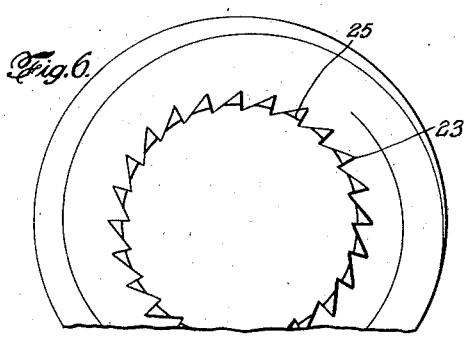
Fig. 6 is a fragmentary end elevation of the same.

Figs. 5 and 6 are views of an alternative form which may be taken by a set-screw embodying the invention, the essential difference from the form hereinbefore set forth lying in the outwardly-extending, rather than inwardly-extending, radial conformation of the tooth contours. A screw 20 is formed with a conically tapered end or tip portion 21 having a reduced projecting part 22 of substantially circular conformation and of a diameter approximating half that of the screw. Outwardly extending from the circumference of the part 22, and evenly spaced thereabout, are formed a plurality of similar tooth portions 23 each bounded by two plane surfaces intersecting on lines forming axial edges and disposed asymmetrically with respect to the radius of the screw, thus giving each tooth a "rake," as fully set forth and explained in connection with the form hereinbefore described.

The central portion of the tip of the screw is preferably relieved, as by the provision of a conical recess or countersink 24 extending from the axis of the screw to a circle 25 slightly larger in diameter than that formed by the inner angles of the teeth, this circle constituting a cutting edge and facilitating engagement of the teeth with the clamped material. With each tooth so formed that when the screw is tightened into clamping engagement with a softer material by combined rotary and axial motion the advancing oblique faces will tend to displace portions of the engaged material in a radial sense without shearing, it will be apparent that the action of the teeth in their engagement with the material will be equivalent to that in the form of screw hereinbefore set forth, and that rotation in a sense to loosen the screw will be opposed by portions of the material engaged by the more or less radial surfaces of the teeth, and that this action will be maintained so long as the screw is not axially displaced to a degree sufficient to allow the axial edges of the teeth to clear the metal originally displaced thereby.

It will be obvious that there has been provided in two alternative forms a setscrew inherently self-locking without the use of accessory parts; and, further, that not only is a setscrew of this nature suited to repeated use without depreciation, but because it does not in any way mutilate the female thread with which it coacts, the parts having such threads can never be damaged by the use of these screws.

I claim:

1. A setscrew for axial clamping engagement with a surface of yielding material, one end of said screw having circularly disposed teeth adapted for such engagement and having edges substantially parallel to the axis of the screw with the leading face of a tooth oblique to the radius of the screw.

2. A setscrew for axial clamping engagement with a surface of yielding material, one end of said screw having circularly disposed teeth adapted for such engagement and having edges substantially parallel to the axis of the screw with the leading face of a tooth oblique to the radius of the screw and the trailing face of less obliquity.

3. A setscrew for axial clamping engagement with a surface of yielding material, one end of said screw having formed therein a cylindrical recess, the wall of said recess bearing circularly disposed teeth adapted for engagement with the surface of the yielding material and the teeth having edges substantially parallel to the axis of the screw with the leading face of a tooth oblique to the radius of the screw.

4. A setscrew for axial clamping engagement with a surface of yielding material, one end of said screw having a projecting cylindrical portion bearing over its exterior surface circularly disposed teeth adapted for engagement with the surface of the yielding material and the teeth having edges substantially parallel to the axis of the screw with the leading face of a tooth oblique to the radius of the screw.

5. A setscrew according to claim 1 in which the teeth are adapted to displace radially and without substantial shearing a portion of the engaged material when being rotated in a sense to force the screw into engagement with the same, said displaced material forming an obstruction to rotation of the screw in the opposite sense, and the edges remain in engagement with the said portion of the engaged material throughout a considerable axial displacement of the screw.

HERMAN KOESTER.